Jan. 2, 1968  SHIGEMITSU MIZUTANI  3,361,380

SPOOL FOR PHOTOGRAPHIC FILM

Filed Jan. 20, 1967

INVENTOR
SHIGEMITSU MIZUTANI

BY Sughrue, Rothwell, Mion, Zinn & Macpeak
ATTORNEYS.

3,361,380
SPOOL FOR PHOTOGRAPHIC FILM
Shigemitsu Mizutani, Kanagawa, Japan, assignor to Fuji Shashin Film Kabushiki Kaisha, Kanagawa, Japan
Filed Jan. 20, 1967, Ser. No. 610,629
Claims priority, application Japan, Jan. 25, 1966, 41/4,243
4 Claims. (Cl. 242—74)

ABSTRACT OF THE DISCLOSURE

A spool for holding photographic film including a rectangular insertion opening within a hollow, cylindrical core and diagonally offset guide surfaces cooperating with spaced upper and lower jaw-like projections for receiving protective apertures within the end of the inserted film.

It is an object of the present invention to provide a film spool in which the end of the photographic film may be readily attached to the core of the spool with a smooth, easy and quick operation.

It is a further object of this invention to provide a film spool in which the means for attaching the end of the photographic film to the core of the spool may be integrally formed within the core, preferably by injection molding of the spool as a unitary element including spaced flanges.

In general, the spool of the present invention comprises a unitary element, formed of plastic or the like, consisting of a cylindrical core carrying spaced flanges with the core having a rectangular insertion opening including two diagonally offset corner portions which are arcuate in shape, the opening further being provided with two jaw-like projections which are spaced axially of the opening, formed on respective opposed walls of the rectangular insertion opening. The projections are so provided that the end portion of a photographic film carrying transversely spaced apertures may be readily attached to the spool with the arcuate corner portion aiding in the insertion of the end of the film into the rectangular opening such that the film apertures receive respective jaw-like projections for securely holding the film end. Each jaw-like projection has a gently inclined forward face such that the inserted end of the film may slide on the forward face toward the opposite wall face with the jaw-like projection being provided with a rather abrupt rear face and carries a deep groove in the plane of the inserted film end so as to make an acute angle for engagement with the film end as the extreme tip of the jaw-like projection passes through or is received within the aperture on the film end. The grooves carried by the upper and lower jaw-like projections are coplanar so as to ensure retention of the film after the jaw-like projections are received within respective apertures. It is desired that the distance between the apex of the groove formed within the jaw-like projection and the wall face opposite to the apex is larger than the distance from the end of the aperture to the end of the film.

The objects and advantages of this invention will become apparent from the accompanying description when taken in conjunction with the following drawings, wherein.

Figure 1:
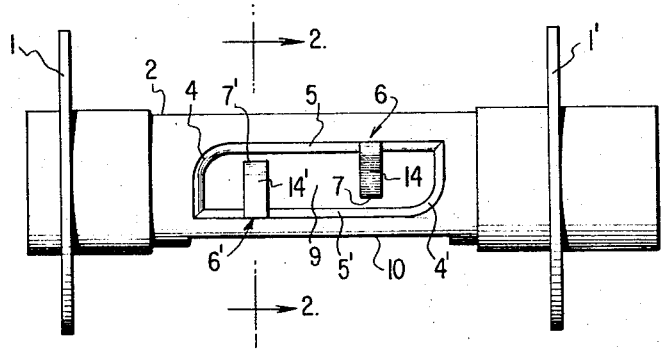
FIGURE 1 is a front view of the spool of the present invention.
Figure 2:
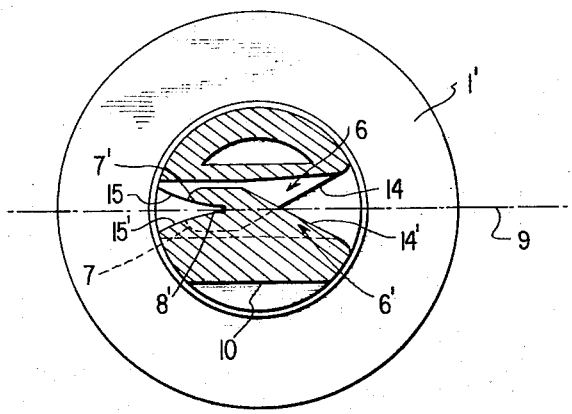
FIGURE 2 is an elevation, in section, taken about lines 2—2 of FIGURE 1.

Referring to the drawings, the spool of the present invention includes spaced flanges 1, 1' for defining the maximum width of film to be wound about the spool and aiding in the winding of the same. The spool further includes an integrally formed cylindrical core 2 for coupling the spaced flanges. Preferably, the spool may be injection molded of plastic material or the like. The core 2 includes a generally rectangular, insertion opening 3 including diagonally offset, rounded or arcuate corner portions 4, 4' which aid in guiding the inserted end of a film strip into coupling position. All of the inside walls of the rectangular insertion opening have a slight inclination such that they are wider at the film insertion side (on the right-hand side of FIGURE 2) and approach each other or become narrower as they approach the opposite side. Jaw-like projections 6, 6' are formed, respectively, to the right and left of the center line of the opening, the projection 6 depending from the upper inside wall 5 of the core section while the jaw-like projection 6' extends upwardly into the opening 3 from the lower inside wall 5'. The projections are spaced from each other and from the center portion toward the opposite sides of the corner portions, respectively. Each jaw-like projection 6 and 6' is further provided with an inclined front surface 14, 14', respectively, on the insertion side of the core so that it may readily guide and direct the inserted end of the film up and over the tip 7 and 7', respectively, of the jaw-like projections 6 and 6'. The rear surfaces 15 and 15', respectively, for the jaw-like projections 6 and 6' are much steeper than the frontal or receiving portions 14 and 14' with the rear surfaces including, respectively, grooves 8 and 8'. The grooves 8 and 8' in the form of acute angles act to ensure locking of the film end after the apertured film receives the tip sections 7 and 7' of the jaw-like projections. The deepest portions of the grooves 8 and 8' are coplanar and also lie on the center line 9 of the core, as indicated in FIGURE 2, although it is only necessary that they register with each other and not necessarily to the center line of the core portion. The cylindrical core may be flattened somewhat at 10 along its exterior surface for facilitating the proper direction of rotation of the spool after insertion of the film end.

Figure 3:
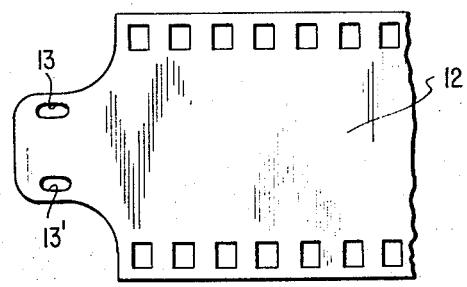
FIGURE 3 is a plan view of a photographic film showing the end of the film which is adapted to be engaged by the spool of the present invention.

The photographic film used with the spool of the present invention must have two apertures at its extreme end. By referring to FIGURE 3, it is noted that film strip 12, at its extreme end, includes opposed apertures 13 and 13'. These apertures may be either circular in form or eliptical, with the distance between the apertures corresponding to the distance between the spaced jaw-like projections 6 and 6'.

In operation, when the end of the photographic film having two end apertures is inserted into the rectangular insertion opening 3, it progresses along the inclination of the jaw-like projection in contact with surfaces 14 and 14' with the film end being bent gradually into an S-shape form since there is a tendency to press the sides of the film end against the circular or arcuate shaped corners 4 and 4'. Further insertion causes the two apertures 13 and 13' to pass over the tips 7 and 7' of the jaw-like projections. The restoring force caused by the S-shaped bend to the film end causes the film to snap back to its flattened configuration with the tips 7 and 7' received within the apertures and with the film generally lying along the center line 9. Any pull in the direction away from the spool, that is, to the right in FIGURE 2, ensures that the tips prevent the film from moving from its locked position within the spool core. The photographic film is, therefore, locked to the spool since the projections engage the two apertures of the film end portion within the respective grooves 8 and 8' of the jaw-like projections. The projections project from different sides of the rectangular opening and during restoration, the force on the film once again flattens the film end. It is almost impossible to withdraw the film end without shearing the film end across the perforation or aperture unless, of course, the film end is again distorted into S-shape. The end of the film will not be broken so long as the tensile strength in excess of twice that existing with respect to a single aperture and projection is exceeded. Moreover, failures or severance at the time of unwinding of the film are greatly reduced since the direction and orientation of the film and spool with respect to each other remains constant because the film end is positively locked by the two grooves which are registered with each other and in a preferred form, with the axis of the spool. In actual practice, when an excessive tensile load is placed upon the film, as sometimes occurs by winding the film to a state where there is no residual film, in continuing the wind-up operation, the perforations on both sides of the film which are placed there for conventional film feeding, will be broken prior to severance at the point of connection between the film and the spool. The film will, therefore, remain in the camera without being wound up and thus may be recovered to the spool by conventional unwinding operation of the camera. On the other hand, in contrast to the present invention, where a single aperture is normally engaged with a single projection carried by the spool, upon excessive tensile load, breakage normally occurs at the point of connection between the film and the spool and not at the point where the perforations for feeding the film engage the film feeding mechanism. This greatly complicates the recovery of the film after such a failure.

Moreover, after locking of the film, the film cannot be withdrawn by action of a force merely in the direction in line with the plane defined by the film and the grooves 8 on the rear side of the projections. Further, even if a two-directional force is applied, it is most difficult to withdraw the film owing to the fact that the film must be distorted into its S-shape much in the same manner as occurs naturally upon insertion of the film prior to unlocking the film from the spool.

By widening the film insertion side of the film end portion, as shown in the drawing, it may be smoothly attached. Further, when the film is attached to the spool by means of an automatic winding machine, it may be necessary to provide a sounding portion or a flattened area on the cylindrical core to ensure that the film is being wound and inserted into the locking opening of the core in a proper direction. The flattened area 10 to the otherwise cylindrical core center section is only one means of ensuring that the film is oriented properly with respect to the spool.

While this invention has been described with particular reference to a preferred embodiment, other embodiments will be apparent to those skilled in the art. It is, therefore, intended to limit the invention only by the scope of the following claims.

What is claimed is:

1. A spool for receiving one end of a web having a pair of laterally spaced apertures, comprising a generally cylindrical core including a rectangular film inserting opening, jaw-like projections extending respectively from the upper and lower walls of said opening, said rectangular opening further including diagonally opposed, rounded corners for bending the inserted end of said web to assist in passing said jaw-like projections through respective apertures of said web end.

2. The spool as claimed in claim 1 wherein the face of said jaw-like projection on the side toward said opening is inclined rearwardly to assist in moving said web apertures onto said jaw-like projections.

3. The spool as claimed in claim 1 wherein each jaw-like projection further includes a groove formed on the rear face thereof, with the apexes of both grooves being coplanar to maintain in said film end a desired position with respect to said supporting spool core.

4. The spool as claimed in claim 3 wherein said grooved apexes are coplanar with said spool axis.

References Cited

UNITED STATES PATENTS

| 1,930,144 | 10/1933 | Lee | 242—74 |
| 2,384,621 | 9/1945 | Isaac | 242—74 |

FOREIGN PATENTS

| 834,693 | 5/1960 | Great Britain. |
| 1,190,785 | 4/1965 | Germany. |

FRANK J. COHEN, *Primary Examiner.*

NATHAN L. MINTZ, *Assistant Examiner.*